United States Patent [19]

Broad

[11] Patent Number: 5,451,088
[45] Date of Patent: Sep. 19, 1995

[54] COMBINATION FRAME-SUPPORTED BOX RECEIVER AND SELF-STABILIZING BED EXTENSION

[76] Inventor: Robert L. Broad, Box 172 Church Rd., Readfield, Me. 04355

[21] Appl. No.: 188,056

[22] Filed: Jan. 26, 1994

[51] Int. Cl.⁶ ............................................. B60R 11/06
[52] U.S. Cl. ...................................... 296/26; 224/521; 224/405; 224/510
[58] Field of Search ................... 296/26; 224/42.03 R, 224/42.45 R, 42.07, 42.03 B, 42.43

[56] References Cited

U.S. PATENT DOCUMENTS

| | | | |
|---|---|---|---|
| 4,029,245 | 6/1977 | Berlin | 224/42.43 |
| 4,856,686 | 8/1989 | Workentine | 224/42.03 B X |
| 4,901,896 | 2/1990 | Speer | 224/42.03 B X |
| 4,951,991 | 8/1990 | Haigler | 296/26 |
| 4,971,237 | 11/1990 | Davis | 224/42.07 X |
| 5,067,640 | 11/1991 | Gaskill | 224/42.03 B X |
| 5,096,102 | 3/1992 | Tolson | 224/42.03 B X |
| 5,267,748 | 12/1993 | Curran | 224/42.03 R X |

Primary Examiner—Joseph D. Pape
Attorney, Agent, or Firm—Stan Jones

[57] ABSTRACT

The present invention makes beneficial use of a vehicle's single point box receiver hitch by transferring an underlying frame mount of the box receiver both outward and adjustably upward simultaneously for load transfer at to a load-supporting cross beam in order to provide a two-axis, cantilevered extension for a pickup truck. The extension apparatus when viewed from above is T-shaped and includes two pieces constructed from box iron. One piece is a longitudinal-running box beam welded at an upward cantilever angle to a short stub section. The second piece is T-shaped when viewed from above and it includes a single adjustment telescoping transition beam which serves as the transition from the longitudinal box beam to the load-supporting cross beam that is transversely oriented relative to the longitudinal beam. A second stub is rigidly connected to the cross beam and it is adjustable by being telescoped over the first angled stub.

10 Claims, 1 Drawing Sheet

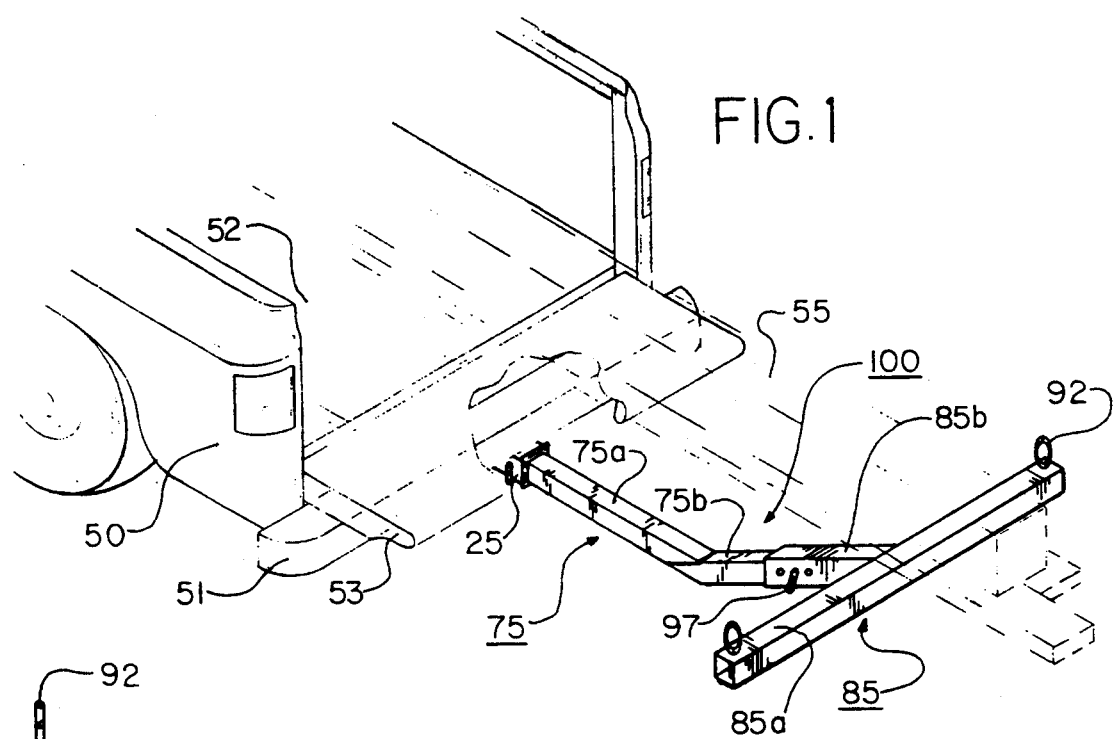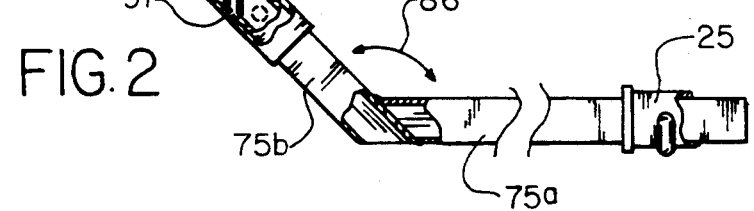

COMBINATION FRAME-SUPPORTED BOX RECEIVER AND SELF-STABILIZING BED EXTENSION

BACKGROUND OF THE INVENTION

1. Field of the Invention

The field of the volumetric invention relates to a method and apparatus for rearmounted removable frame extension devices that increase the bed length of pickup trucks and similar vehicles. In a more limited sense the field of this invention relates to a low profile, single rail, cantilevered frame extension apparatus of the type which is solely frame mounted and free of any supporting connections to the vehicle body proper.

2. Description of Prior Art

Extension apparatus for increasing the load carrying capacity for beds on pickup trucks is well known. A search of the prior art, however, does not disclose the combination of a frame mounted box receiver hitch, two-piece, T-shaped (when viewed from above) box beam extension apparatus that is solely single paint, frame-supported and adjustable by an upward fixably and cantilevered angled from a central vehicle-mounted frame location which secures single point box receiver hitch to the truck frame.

The art, instead, centers mostly on complex bed-supported extensions or combination frame/bed cable, rope, rod and rail extension schemes. In a general sense, such prior art has focussed on struts and trusses to increase volumetric load capacity without realizing that load support, weight transfer and stabilization are more important issues.

For instance, U.S. Pat. Nos. 2,712,470 to Cardini and 2,852,303 to Hopson are fairly representative of the art illustrating bed-mounted, U-shaped extension racks. Such carriers and/or racks suffer numerous drawbacks associated with their design and their various methods of attachement. Cardini is U-shaped with two horizontal arms extending from the upper flanges of the truck bed and then descending downward from the horizontal at the bight portion of the U for load carrying capacity.

Hopson has a substantially U-shaped bed within-a-bed and relies upon bed-mounted rollers for extension. Neither of these patents disclose a frame mounted box receiver hitch. Both suffer from unduly stressing the vehicle's components per se. Additionally, these references do not appreciate or recognize the importance of a single point, two axis frame mounted cantilever principle which yields a low profile (i.e. short rearward extension), easily removable and/or installed load extension apparatus.

The U.S. Pat. Nos. to Haigler 4,951,991 and Chamberlin et al 4,932,703 are again U-shaped and respectively rely on unduly complex frame and bed mounting rails and/or cables. In Haigler, a cable is centrally located and the extension is a particularly complex two-rail telescoping frame that is housed under the truck when not in use.

Chamberlin et al discloses a pair of bed-mounted cables suspenders connected as load-support for a horizontal beam member that is centrally pivoted by a stabilizing brace or strut which is connected to a bumper location. These cited prior art patents depict the complexity that is fairly representative of the state of the art.

An even more complex load extension apparatus is shown by the derrick approach described in U.S. Pat. No. 5,120,102 to Cumbie. Cumbie is a slightly different version of the Chamberlin et al philosophy of using cables and trusses for extension purposes. It is a high profile apparatus which relies both on attachment to the vehicle bed and a swivel bolt adjacent to the bumper's trailer ball hitch in order to provide a truss suspension approach. This Cumbie-type apparatus is not desirable for a great number of reasons such as the stresses placed upon the sides of the truck bed by the chains and cables and the stress placed upon the bumper of the Cumbie vehicle.

Having briefly reviewed the typical state of the prior art, it can be seen that several obstacles stand in the path of successfully employing a rear-mounted load handling apparatus. In accordance with this invention, the complexity of the telescoping trusses and extension members has been eliminated. Additionally, the cable and complex two-rail strut or cable philosophy has been discarded.

Finally, the method and apparatus of this invention is simple, durable relatively lightweight and easily removed and quickly re-installed length/height adjustment as needed. With today's popularity for pickup trucks being enjoyed by every member of the family, such apparatus must be suitable for use by women, seniors and teenagers.

SUMMARY OF THE INVENTION

In accordance with this single rail extension device invention, an angled horizontal and upward telescoping cantilever principle is put to work on a vehicle equipped with a centrally located box receiver hitch. When viewed from above and in use, the extension device is T-shaped. The invention may be easily removed and/or installed with a minimum number of relatively lightweight pieces.

In accordance with the invention a central frame single point support at a box receiver hitch is transferred to a horizontal load carrying member that is positioned in a spaced-away relationship from the truck's dropped tailgate. That horizontal transverse load supporting beam, in turn, is stabilized in a level horizontal position (when viewed from the rear of the vehicle) free from any rocking by the square box configuration of the extension apparatus itself which mates into and is anchored into the box receiver hitch by hitch pins retained in place by spring-loader retainer clips.

Structurally, a centrally located longitudinal box beam fully extends into the box receiver at one end and the other end extends beyond the length of the truck for a few feet. When viewed from the side, that longitudinal box beam extends rearwardly in a longitudinal direction to a point about even with the rearward edge of the vehicle's dropped tailgate. At that point the longitudinal beam is rigidly fastened to an upwardly angled length-adjustable transition beam, which transition beam is angled upward at an obtuse angle selected such that the transition beam clears the dropped tailgate. This adjustability of the length of the transition beam provides both an upward and a rearward adjustment by a single adjustment setting, and at the same time ultimately transfers the single point frame support of the box receiver to a horizontal load transfer and supporting box beam located a few feet away from, and above, the dropped tailgate.

That load supporting beam, when viewed from above is the top portion of the T-shaped two-piece extension apparatus of this invention. The load supporting beam in my extension load transfer apparatus does not allow any significant angular deviations from the transverse (i.e. rock in the horizontal direction) due to the box construction of a box longitudinal beam into a frame mounted box receiver. Thus, my load support cross beam is self stabilizing and free from any vehicle body stabilizing members other than the frame mounted box receiver hitch itself.

The above-mentioned transition beam comprises two telescoping box pieces which fit within one another and include a plurality of mating aligned holes which allow them to be anchored securely together by a single adjustment at a selected pair of telescoped and matching holes. When so anchored the telescoped sections provide both stability and simultaneous rearward and upward adjustability for the cantilevered extension apparatus of this invention. An adjustability feature of my low profile invention readily accommodates variations in different truck styles and load bed configurations in pickup trucks, broncos, vans and similar vehicles that are in use today.

OBJECTS OF THE INVENTION

It is an object of the present invention to removably cantilever a rear-mounted load transfer extension apparatus from a frame mounted single point box receiver hitch on a pickup truck or similar vehicle.

It is another object to use the box shape of a single point hitch receiver to advantage in order to self-stabilize a transfer load-supporting beam that is located a spaced upward and rearward distance from the truck's dropped tailgate while such beam is cantilevered from a frame mounted box receiver.

It is still another object of the present invention to make useful application of installed box receiver hitches by removably housing therein a longitudinally running box beam which comprises a telescoping angled transition beam that transfers the frame support at the box receiver location to a non-rocking horizontal load-supporting beam spaced away from a vehicle's dropped tail gate at about truck bed level.

It is also an object of the present invention to take advantage of the strength and stability of the box receiver hitch as a convenient and ready mounting platform for a simple T-shaped cantilevered extension apparatus for pickup trucks.

It is a further object of the present invention to allow for quick and easy removal and/or installation of a two-piece, cantilever-angled extension apparatus constructed of a two-axis cantilevered box beam fitting within a frame mounted box receiver hitch on a pickup truck, bronco or similar vehicle.

BRIEF DESCRIPTION OF THE DRAWINGS

FIG. 1 illustrates a perspective view of a rear-mounted angled cantilever extension apparatus of the invention installed in a box receiver hitch of a pickup truck.

FIG. 2 illustrates a side view of the extension device of FIG. 1 in partially cut away section to depict the telescoping box construction at a cantilever angle useful for transferring the frame support from a box receiver hitch to a horizontal load-transferring location about level with a dropped tailgate.

DESCRIPTION OF THE PREFERRED EMBODIMENT

Turning now to FIG. 1, a perspective view of a rear-mounted angled cantilever extension device 100 of the invention is shown releasably installed into a box receiver hitch 25 of a truck 50. Many vehicles today are equipped with such box receivers of several different and well known types. Such hitches are used for mounting load equalizing apparatus for camper-trailers, towing light trailers and the like.

Numerous types, well understood in the art, are readily available on the market. Such types are manufactured and sold under the trade names Ideal, Reese, and the like.

A box receiver hitch and its manner of frame fastening need not be shown in detail in this application. Instead it should be understood that the common box receiver 25 is bolted, welded or otherwise securely fastened in place to the main under-frame supporting structure of the truck 50. Once installed such box receivers remain on the truck, more or less, as a permanent installation. It is rarely removed by the truck owner unless the truck is being sold or traded.

My experience has shown that most truck operators are wise and experienced in load hauling capacity. Heavy items are placed in the bed proper up toward the cab area in order to more evenly distribute the weight between the axles of the vehicle. In home construction and several related trades such as plumbing, window washing and the like, long items which are not extremely heavy must occasionally be carried. Typical for example would be long lumber, insulation rolls and the like. Today's trucks can safely handle the weight of such items and even the tailgates are equipped with straps and cable connections to increase the bed's hauling capacity for the truck.

When longer lumber must be carried, however, I have discovered that it is not the weight that is the major problem. Instead, it is primarily the length, particularly for flexible lumber such as long moldings, lathe and the like that should be accommodated. Every homeowner has returned home from do-it-yourself and lumber stores with extra length items protruding from the truck carrying a red warning flag at the end of the protruding lumber. This invention will allow such longer items to be safely carried when the tailgate is down and yet will perform a load-supporting function that transfers the rearmost weight of the load, i.e. that which is rearward of the load's pivot point, to the transverse beam, and at the same time relieves the stress and undue weight from a dropped tailgate.

In essence the pivot point for the load being hauled has been moved rearward and is now located at the load transfer cross beam in accordance with my invention. Coupled with this advantage is a self-stabilizing feature that is achieved for the cross beam due to the square construction of a single rail being securely received in a frame mounted box receiver. My two-axis, single rail, cantilevered load transfer invention is characterized by freedom from any chains, cables or similar connections to the vehicle body proper.

This invention puts box receiver hitches to a new use in that a box receiver 25 houses a longitudinal beam 75 at a sturdy and centrally located frame position below bumper 51 on truck 50. Longitudinal, as used herein, means a centrally-located direction running, in the first axis, the same direction as the vehicle. Angled refers to the transition from a low location of the box receiver to the horizontal (when viewed from the rear, higher location to the cantilevered second axis, wherein the transversely oriented transfer resting lies.

The box receiver's frame mount is the fixed point for the novel two-axis cantilever principle employed to unusual advantage in my invention. It should be recognized that a larger box beam 75 can be reduced down to the square dimensions for the box receiver. Additionally the box beam into the box receiver can still provide protection from rocking if that box beam portion is then welded unto a rounded tubular pipe or other suitable material. For rigidity and strength, however, my preferred form of the invention is as depicted and described.

Extension 100, as shown in a preferred form in perspective view of FIG. 1, is a two-piece single rail unit having a T-shaped end piece 85 telescoped over the upwardly angled free end of beam 75. Both pieces are angled at the same angle. Moreover both pieces are secured together by a large angle hitch pin 97 and a spring loaded retainer clip. Pin 97 is a cold rolled steel pin that passes through aligned openings in both pieces 75 and 85. While spring clip retainer and hitch anchor pins are preferable for this invention, due to their quick and easy installation and/or removal, it should be recognized that nuts and bolts or other types of fastening devices may be used without departing from the structural philosophy underlying my invention.

Extension 100, I have discovered, can preferably be constructed of two unitary box iron pieces of common box iron beam material. Such material normally comes in standard square cross-sectional sizes that may readily be cut and welded as required. For example, in the cut away view of my FIG. 2, the first longitudinal beam 75 is comprised of a straight section 75a that has a transverse opening drilled therethrough near one end so that beam 75 can be slidably received and firmly joined to the box receiver by an angled hitch/anchor pin and retainer spring clip 82. The openings are aligned in both box receiver 25 and the end of beam 75 so that the two are structurally joined securely to one another at a centrally located square opening in a vehicle's frame-mounted box receiver hitch 25.

This rigid first extension piece 75 runs longitudinally rearward of the vehicle parallel to the plane of the pickup bed in order to extend the vehicle's frame support a given rearward distance. By employing a cantilever angle 86, FIG. 2, of about 135 degrees, the straight longitudinal run 75 may be kept to a minimum, while the length-carrying capability for extension 100 is at a maximum. Stated another way, the length-carrying capability is increased without danger of the longitudinal beam 75 dragging the ground while going up hill or over dips.

First extension piece 75 comprises the longitudinal box beam 75a and an angled stub section 75b. Stub 75b is rigidly fastened to 75a by a weld, or other similar attachment means. The structural function for this piece 76b, including the angular offset of stub 75a is to transfer the frame support upward to where it is about level with the bed 52 of vehicle 50 when piece 85 is joined with piece 75. Thus, this invention provides a point of low attachment and a secure frame mounted location for its load-supporting cantilever feature.

The unpinned end of the angled stub 75b adjustably mates into and is firmly pinned to a second unitary telescoped T-shaped box iron extension piece 85. Piece 85 comprises a cross beam 85a attached to a downward angled stub 85b also lying at the cantilever angle 86. This stub 85b may advantageously be constructed from a larger sized box beam relative to stub 75b. Box stub 85b thus has an inner tubular dimension that is slightly greater than the outside dimensions of stub 75a, and the two stubs snugly telescope together along the cantilever angle 86.

A horizontal load-supporting beam 85a is transversely positioned at the top of the second extension piece 85b and is also made rigid and unitary with stub 85b by welding or other suitable fastening construction. The T-shaped box iron piece 85 transfers by a double, or two-axis, cantilever principle the single point 25 is one axis, to a load transfer beam 85a lying in a second axis, which second axis runs left and right frame support horizontally across the width of the truck bed. Transversely located load transfer beam 85a acts as a load resting surface for longer length items to be hauled by truck 50.

As depicted in FIG. 1 an overly long load 55 may be safely supported across the width and length of the truck bed 52 without unduly stressing tailgate 53. At the top of cross beam 85 at each end are eye bolts 92 that serve as tie-downs for ropes to tie the lumber load 55 to the extension device 100. Obviously tie down openings in the cross beam 85a would work just as well since most loads are simply lashed down with restraining twine or light rope.

If made from one unitary piece, this simple T-shaped extension 100 will still be relatively manageable and will allow pickup trucks to carry longer loads without creating any unduly large load pressure on the vehicle's dropped tailgate. By separating the extension device 100 into two pieces and locating one adjustment 97 in the two telescoping sections, simultaneous upward and rearward the adjustability is readily provided for in the angled section for extension 100. I provide a greater separation between the end of tailgate 53 and the cross beam 85a while still providing for a variable height relative to the plane of the pickup bed. Additionally, of course, each one of the two pieces is more convenient for storage and ease of handling.

As a non-limiting example the distance between the end of the dropped tailgate and the cross beam may be in the order of three to four feet. By using my extension device the normal bed length of about eight feet has thus been lengthened to about twelve feet or so. More importantly, the single simultaneous vertical and rearward adjustment for my extension creates a two point load carrying system wherein the frontmost portion of the load is carried by the bed proper, and the support point for the rearmost overhanging portion of the load is transferred to the rear about three to four feet beyond the dropped tailgate. That rearmost load portion rests on the transverse beam 85a, and by elevating the location of load rest 85a such that it is above the tailgate all, or essentially all, undue weight and stress from the load is removed from the tailgate. The short longitudinal run offered by longitudinal beam 75a of my invention allows a loaded truck with extra long loads to travel at ordinary speeds, move up or down hills and driveways, through dips and gullies and over mounds without undue dragging of the extension apparatus during such travel. Thus, my device will readily allow longer and heavier loads to be handled in a simple, safe and economical manner.

Those skilled in the art will appreciate that the conception, upon which this disclosure is based, may be readily used as a basis for other carrying devices. It is important, therefore, that the claims be regarded as including such equivalent constructions insofar as they do not depart from the spirit and scope of the present invention.

While my invention has been described with reference to a particular example of preferred embodiments, it is my intention to cover all modifications and equivalents within the scope of the following claims. It is therefore requested that the following claims, which define my invention, be given a liberal interpretation which is within the spirit and scope of my contribution to this art.

What is claimed is:

1. A method of increasing the bed and dropped tailgate length for lengthy articles to be hauled by moving pickup truck vehicles having a given bed width and bed length, with said lengthy articles being significantly longer than said bed length and having a load pivot point located at said tailgate with a frontmost load located in the bed forward of the pivot point and a rearmost load of said lengthy articles extending rearwardly and unsupported beyond said pivot point, said method comprising the steps of:

double cantilevering by an adjustable orthogonal pair of first and second cantilevered axes a single rail T-shaped extension apparatus having said cantilevered axes pair extending from a single fixed cantilever point by a longitudinal box beam housed in a box receiver hitch which is mounted at the center of the rear frame of said vehicle;

longitudinally extending said single rail rearward in said first cantilever axis running longitudinally along the length of said truck from said single fixed cantilever point;

adjustably spacing a transversely oriented load rest selected with a length about equal to said given width of said bed essentially parallel to and slightly higher than a dropped tailgate for said vehicle, with said load rest being located in said second cantilevered axis and also cantilevered from said single cantilever point at a distance of between about two to four feet from the rearmost edge of said dropped tailgate;

rigidly connecting a center point of said load rest to an angled transitional beam, which beam extends upward from the longitudinal beam and rigidly joins said center of said load rest to the longitudinal beam;

stabilizing the load rest from horizontal rocking by removably locking a square end of said longitudinal box beam into a mating square receiver opening of said single point frame mounted box receiver;

supporting the rearmost load portion of the load to be hauled by a pickup vehicle on the transverse beam;

supporting the frontmost load portion of the load to be hauled in the bed proper of the vehicle; and removing, in response to said frontmost and said rearmost supporting steps essentially all undue load weight from said dropped tailgate.

2. A method of increasing the bed length for lengthy volumetric articles to be hauled by pickup truck vehicles in accordance with claim 1 and wherein said adjustably spacing step for positioning said transversely oriented load rest beam comprises the further steps of:

separating the angled transition beam into two separate stub section:

telescoping the two stub sections together to form a rigid transition beam;

selecting the rearward starting point and the angle for the upward angled transition beam at such a location and at an obtuse angle of about 135 degrees relative to the horizontal such that the transition beam clears the vehicle's dropped tailgate by said two to four feet distance;

adjusting the location of said load rest simultaneously in a rearward and upward position; and locking said adjusted telescoping transition beam at said selected position by a single adjustment setting means.

3. A method of increasing the bed length for lengthy volumetric articles to be hauled by pickup truck vehicles in accordance with claim 2 and comprising the further steps of:

providing for the adjustable length of said upward angled transitional beam by providing a pair of telescoped stub sections in said transitional beam;

drilling several openings through one stub section, which openings are adjustably aligned with at least one other opening drilled through the other stub section; and said locking step with said single adjustment setting means further comprises the additional steps of;

anchoring the two telescoped stub sections together with one anchoring hitch pin only, which hitch pin passes through aligned openings in said two stub section; and securing said anchor pin in place by means of a spring loaded retainer ring.

4. A method of increasing the bed length for lengthy volumetric articles to be hauled by any one of several different pickup truck vehicles in accordance with claim 2 wherein said apparatus is separable into two pieces for ease of apparatus removability and interchangability, and comprising the further steps of:

removing said T-shaped extension apparatus from one vehicle;

installing said apparatus in a box receiver of another vehicle; and compensating for structural differences in the bed height between said different vehicles by said adjustable spacing step.

5. A method of increasing the bed length for lengthy volumetric articles to be hauled by pickup truck vehicles in accordance with claim 2 wherein said articles include long lumber having a frontmost and rearmost portion when loaded, said load rest is a box beam, and said method further comprises the additional steps of:

adjusting simultaneously the rearward and height location of said transversely-oriented box beam so that said frontmost portion of said lumber is placed on the bed of said pickup vehicle and said rearmost lumber portion extends for several feet beyond the dropped tailgate;

resting said extending rearmost portion of said long lumber for support on said box beam; and selecting said simultaneous adjustment at such a location that said loaded lumber may be safely hauled while said vehicle is under way without placing undue weight from said loaded lumber on said dropped tailgate of said vehicle.

6. A method of increasing the bed length for said lumber to be hauled by pickup truck vehicles in accordance with claim 5 and comprising the further steps of:
- locating a pair of eye bolts, one each at each end of said load rest; and
- lashing said rearmost lumber portion to said load rest by ropes passed through said eye bolts and around said lumber.

7. An apparatus for increasing the bed length of pickup truck vehicles by employing a single rail, adjustable orthogonal axes cantilevered extension device, which extension device is solely frame mounted and free from any supporting connections to the vehicle body proper, and which extension apparatus slidably fits within a box receiver hitch that is frame-fastened to the rear frame of said pickup truck underlying the truck's bumper, said apparatus comprising:
- a first longitudinal box beam of square construction that fits within said box receiver hitch and runs rearward from the vehicle a short distance;
- a transversely oriented load rest beam positioned rearward and above said first longitudinal beam;
- a first cantilever angle defined at the free end for said first longitudinal beam, with said cantilever angle starting at a short distance to the rear of said vehicle and selected at an obtuse amount in the range of about 135 degrees relative to the horizontal, with said rearward distance and said first cantilever angle being selected such that said transversely oriented load rest beam is located at a position selected from about two to four feet rearward of the rearmost edge of a dropped tailgate of said vehicle;
- a first upward box stub beam welded or otherwise rigidly connected to said first longitudinal box beam, with said stub beam being positioned in said first cantilever angle;
- a second box iron stub beam selected to telescope over the first upward stub beam;
- said transversely oriented load rest beam having a length about equal to the width of the vehicle bed and being right angle welded with the second stub beam at the center of said transverse beam and at said cantilever angle, with said load rest beam being adjustably fastenable and oriented in a direction that is transverse to the direction of said first longitudinal beam; and
- a single adjustment fastening means in said first and second telescoped stub beams for adjusting the rearward location and height of said cross beam so that lumber placed on said vehicle as a two point supported load may rest, at one end of said lumber load, on the bed of said vehicle and may extend beyond a dropped tailgate of said vehicle and rest at the other end of said lumber load for support on said transversely oriented load rest beam without placing any or essentially any undue weight on said dropped tailgate.

8. A readily detachable and re-attachable apparatus for increasing the bed length for lengthy volumetric lumber articles to be hauled by pickup truck vehicles, wherein the length of such lumber articles, in an essentially horizontal position spanning from the vehicle and unto the apparatus, exceeds the length of the pickup bed plus the vehicle's dropped tail gate, said detachable/re-attachable apparatus comprising:
- a single rail T-shaped extension device double cantilevered from a single fixed point in the form of a longitudinal box beam housed in a box receiver, which box receiver is mounted at the center of the rear frame of said vehicle and extending rearward and upward with a free end located about three to five feet from the rearward end of the dropped tailgate for said vehicle;
- a transversely oriented load rest forming the top portion of said single rail T shape, with said load rest positioned essentially parallel to and about level with a lumber article-carrying portion of said vehicle and said load rest being secured at its center to said free end of said cantilevered single rail;
- means rigidly connecting the center of said load rest to the free end of said cantilevered rail, with said load rest being characterized as also cantilevered from said single fixed point and free of any connecting means to said vehicle other than said single rail and said fixed point;
- a single adjusting means for simultaneously and selectively adjusting the location of said load rest upwardly and rearwardly to an elevated position that relieves essentially all undue weight from the dropped tailgate of said vehicle when one end of an essentially horizontal load of lumber being hauled is resting on said load rest and the other end of said lumber is resting in the bed of said vehicle;
- locking means rigidly connecting a square end of said longitudinal box beam into a mating square receiver opening located in said box receiver for stabilizing the load rest from horizontal rocking due to loads resting outside the center point and on the cantilevered ends of the transverse load rest beam; and
- said locking means being readily removable and easily re-attachable by a user as said apparatus is installed and removed at will from one vehicle equipped with a box receiver hitch to another such vehicle.

9. Apparatus for increasing the bed length for lengthy volumetric lumber articles to be hauled by pickup truck vehicles in accordance with claim 8 and said single adjusting means further comprising:
- an angled transition beam lying in a plane interconnecting the double cantilever for said apparatus, with said angled transition beam rigidly connected between said longitudinal box beam and said transversely oriented load rest;
- said angled transition beam comprising two separate stub sections: and
- means telescoping the two stub sections together in a single adjustable and settable connection.

10. Apparatus for increasing the bed length for said articles to be hauled by said pickup truck vehicles in accordance with claim 9 wherein said single adjustable and settable connection is located between said longitudinal box beam and said load rest, with said connection further comprising:
- several openings drilled through one stub section, which openings are adjustably aligned with another opening drilled through the other stub section; and
- means for lockably anchoring the two telescoped stub sections together by an anchoring hitch pin which passes through selected openings, which pin is secured in place by a spring loaded retainer ring.

* * * * *